United States Patent
Vanderlinden et al.

(10) Patent No.: US 9,815,013 B2
(45) Date of Patent: *Nov. 14, 2017

(54) FILTER ELEMENT SUPPORT ASSEMBLY, QUICK INSTALLATION SYSTEM, AND METHODS

(71) Applicant: Donaldson Company, Inc., Minneapolis, MN (US)

(72) Inventors: Jimmy Vanderlinden, Herent (BE); Dominique Renwart, Hoegaarden (BE); Benjamin Nichols, Bierbeek (BE); Erwin Jean Marie Verbelen, Meise (BE)

(73) Assignee: Donaldson Company, Inc., Minneapolis, MN (US)

( * ) Notice: Subject to any disclaimer, the term of this patent is extended or adjusted under 35 U.S.C. 154(b) by 194 days.

This patent is subject to a terminal disclaimer.

(21) Appl. No.: 14/534,582

(22) Filed: Nov. 6, 2014

(65) Prior Publication Data
US 2015/0052860 A1 Feb. 26, 2015

Related U.S. Application Data

(63) Continuation of application No. 12/816,667, filed on Jun. 16, 2010, now Pat. No. 8,956,434.
(Continued)

(51) Int. Cl.
*B01D 46/00* (2006.01)
*B01D 46/42* (2006.01)
(Continued)

(52) U.S. Cl.
CPC ..... *B01D 46/4227* (2013.01); *B01D 46/0001* (2013.01); *B01D 46/002* (2013.01);
(Continued)

(58) Field of Classification Search
CPC .... B01D 46/00; B01D 46/42; B01D 46/4227; B01D 46/0001; B01D 46/005;
(Continued)

(56) References Cited

U.S. PATENT DOCUMENTS

| 4,171,963 A | 10/1979 | Schuler |
| 4,199,334 A | 4/1980 | Berkhoel |

(Continued)

FOREIGN PATENT DOCUMENTS

| DE | 10 2004 021 180 A1 | 11/2005 |
| DE | 20 2007 011 096 U1 | 1/2009 |

(Continued)

OTHER PUBLICATIONS

Declaration of Jimmy Vanderlinden, with Exhibits A-C, executed Dec. 6, 2010.

(Continued)

Primary Examiner — T. Bennett McKenzie
(74) Attorney, Agent, or Firm — Merchant & Gould P.C.

(57) ABSTRACT

A filter element support assembly for mounting a filter element to a tube sheet includes a plurality of elongated rods; a first clamp having a through-hole; the first clamp defining a plurality of rod seats sized to receive a first end of one of the rods; a clamp rod extending through the through-hole in the first clamp; a second clamp having a through-hole; the clamp rod extending through the second clamp through-hole; the second clamp being mounted against the first clamp; the second clamp having radially projecting bumps mounted against the rods adjacent to the first clamp to hold the rods in the rod seats; a plurality of feet; each foot being secured to a second end of one of the rods; and a handle secured to an end of the clamp rod.

9 Claims, 6 Drawing Sheets

Related U.S. Application Data

(60) Provisional application No. 61/219,119, filed on Jun. 22, 2009.

(51) Int. Cl.
    *B01D 46/02*     (2006.01)
    *B01D 46/04*     (2006.01)
    *B01D 46/08*     (2006.01)
    *B01D 50/00*     (2006.01)

(52) U.S. Cl.
    CPC ..... *B01D 46/0005* (2013.01); *B01D 46/0058* (2013.01); *B01D 46/0068* (2013.01); *B01D 46/02* (2013.01); *B01D 46/04* (2013.01); *B01D 46/08* (2013.01); *B01D 50/002* (2013.01); *B01D 2265/027* (2013.01); *B01D 2265/028* (2013.01); *B01D 2275/201* (2013.01); *Y10T 29/49826* (2015.01)

(58) Field of Classification Search
    CPC .............. B01D 46/002; B01D 46/0058; B01D 46/0068; B01D 46/02; B01D 46/04; B01D 46/08; B01D 2265/027; B01D 2265/028; B01D 2265/201; Y10T 29/49826
    USPC ............ 55/341.1–341.7, 356–357, 361–382, 55/490–519; 29/428
    See application file for complete search history.

(56) References Cited

U.S. PATENT DOCUMENTS

| | | |
|---|---|---|
| 4,262,403 A | 4/1981 | Wilhelm et al. |
| 4,323,376 A | 4/1982 | Rosenquest |
| 4,498,914 A | 2/1985 | Ericksen |
| 4,557,738 A | 12/1985 | Menasian |
| 4,565,555 A | 1/1986 | Menasian |
| 4,767,427 A | 8/1988 | Barabas et al. |
| 4,775,469 A | 10/1988 | Zimmerly |
| 5,062,872 A | 11/1991 | Williams |
| 5,261,934 A | 11/1993 | Shutic et al. |
| 5,342,433 A | 8/1994 | Avondoglio |
| 5,599,364 A | 2/1997 | Hawkins |
| 5,746,796 A | 5/1998 | Ambs et al. |
| 5,803,941 A | 9/1998 | Berkhoel et al. |
| 5,895,510 A | 4/1999 | Butler et al. |
| 6,214,077 B1 * | 4/2001 | Bitner ................ B01D 46/0005 55/490 |
| 6,368,386 B1 | 4/2002 | Nelson et al. |
| 6,368,388 B1 * | 4/2002 | Kosmider .......... B01D 46/0004 55/490 |
| 6,676,721 B1 | 1/2004 | Gillingham et al. |
| 7,344,577 B2 | 3/2008 | Berkhoel |
| 8,070,848 B2 | 12/2011 | Cosgrove |
| 2004/0103626 A1 | 6/2004 | Warth et al. |

FOREIGN PATENT DOCUMENTS

| | | |
|---|---|---|
| EP | 1 882 510 A1 | 1/2008 |
| GB | 2 454 306 A | 5/2009 |

OTHER PUBLICATIONS

International Search Report and Written Opinion dated Mar. 16, 2011.

\* cited by examiner

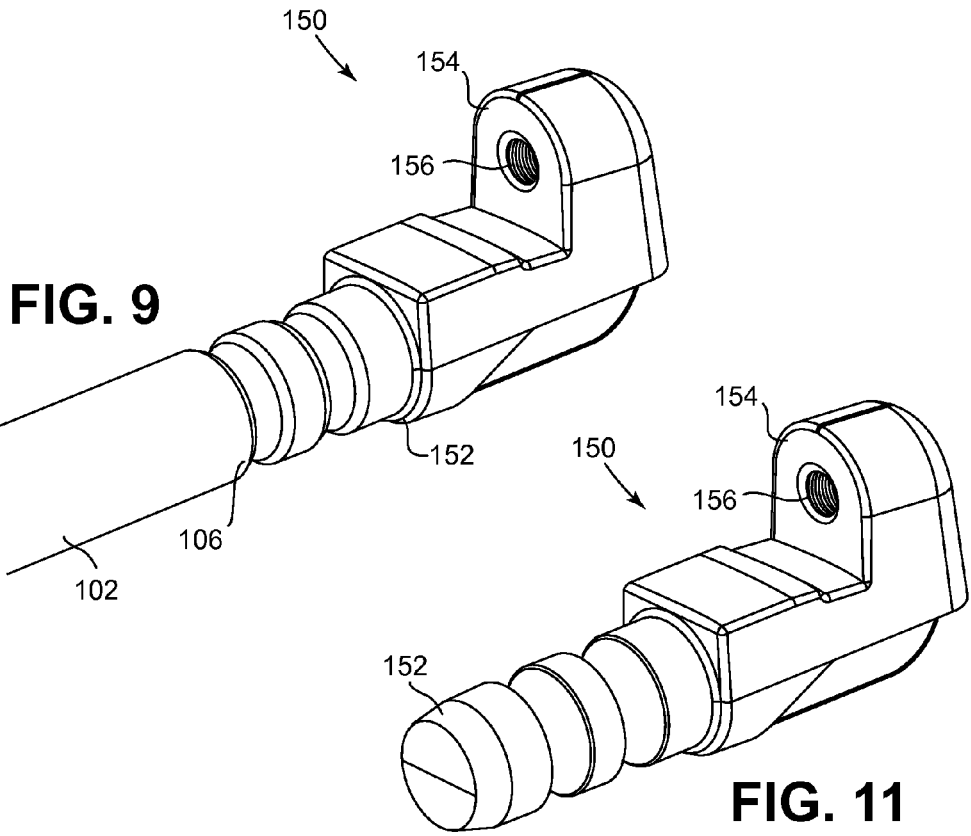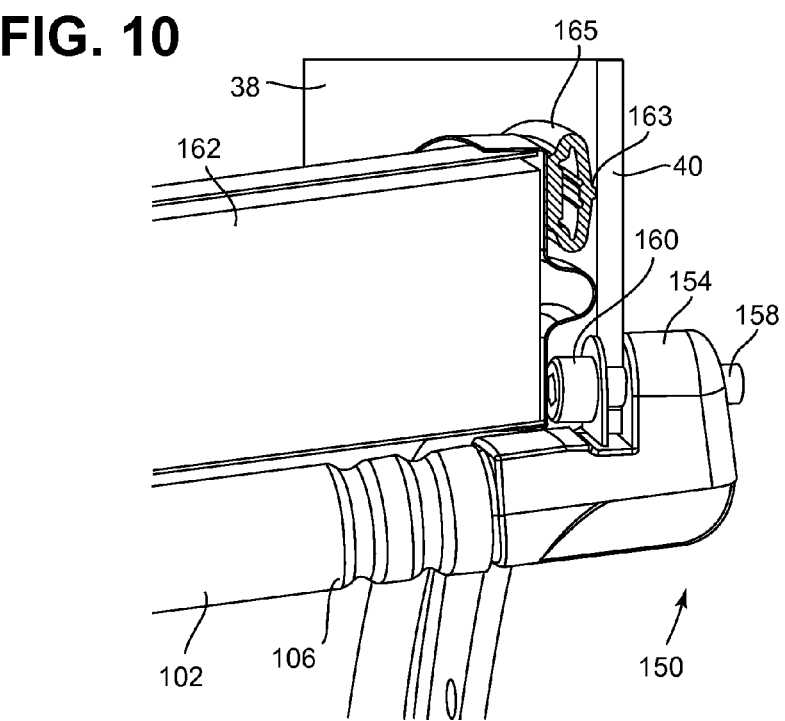

US 9,815,013 B2

FILTER ELEMENT SUPPORT ASSEMBLY, QUICK INSTALLATION SYSTEM, AND METHODS

CROSS REFERENCE TO RELATED APPLICATION

This application is a continuation of application Ser. No. 12/816,667, filed Jun. 16, 2010, which application claims the benefit of provisional application Ser. No. 61/219,119, filed Jun. 22, 2009, which applications are incorporated herein by reference in their entirety.

TECHNICAL FIELD

This disclosure concerns filters for use in air intakes for gas turbines, industrial compressors, and other systems using filters. In particular, this disclosure concerns support assemblies, installation mechanisms, and methods for filters used in these systems.

BACKGROUND

Air intake for gas turbines and other systems, such as industrial compressors, require filtration of the air so as to not damage internal components to this equipment. Improvements in filter systems are desirable.

SUMMARY

A filter element support assembly for mounting a filter element to a tube sheet is provided. The assembly may include a plurality of elongated rods having first ends; a first clamp having a through-hole; the first clamp defining a plurality of rod seats sized to receive a first end of one of the rods; the rods seats each holding a first end of one of the rods; a clamp rod extending through the through-hole in the first clamp; a second clamp having a through-hole; the clamp rod extending through the second clamp through-hole; the second clamp being mounted against the first clamp; the second clamp being constructed and arranged to hold the rods in the rod seats; a fastener arrangement secured to the clamp rod; the first clamp being axially between fastener arrangement and the second clamp; a plurality of feet; each foot being secured to a portion of one of the rods; and a handle secured to an end of the clamp rod.

In another aspect, a filter system is provided including a tube sheet having a plurality of tube sheet apertures; a support assembly as characterized above; the feet securing the support assembly to the tube sheet aperture; and a filter element mounted on the support assembly; an end cover on an end of the filter element; the handle being pivotable between a clamped position engaging the end cover and a release position.

In another aspect, a quick-release system to clamp and release a filter element onto a tube sheet is provided. The system includes a tube sheet having an aperture; a filter element support assembly secured to the tube sheet; a filter element arrangement mounted over the support assembly and having a tube sheet end mounted against the tube sheet; an end cover oriented over an end of the filter element arrangement opposite of the tube sheet end; and a handle having a bearing surface; the handle being secured to the support assembly and being pivotable between a clamped position and a release position; the clamped position including the handle bearing surface being engaged against the end cover; and the release position including the handle bearing surface being away from the end cover.

It is noted that not all these specific features described herein need to be incorporated in an arrangement for the arrangement to have some selected advantage according to the present disclosure.

BRIEF DESCRIPTION OF THE DRAWINGS

FIG. 9 is a perspective view of a foot mounted on the end of a rod, used in the assembly of FIG. 2;

FIG. 10 is a perspective view of a portion of the assembly of FIG. 2 secured to a tube sheet;

FIG. 11 is a perspective view of the foot of FIG. 9;

DETAILED DESCRIPTION

A. System, FIG. 1

Figure 1:
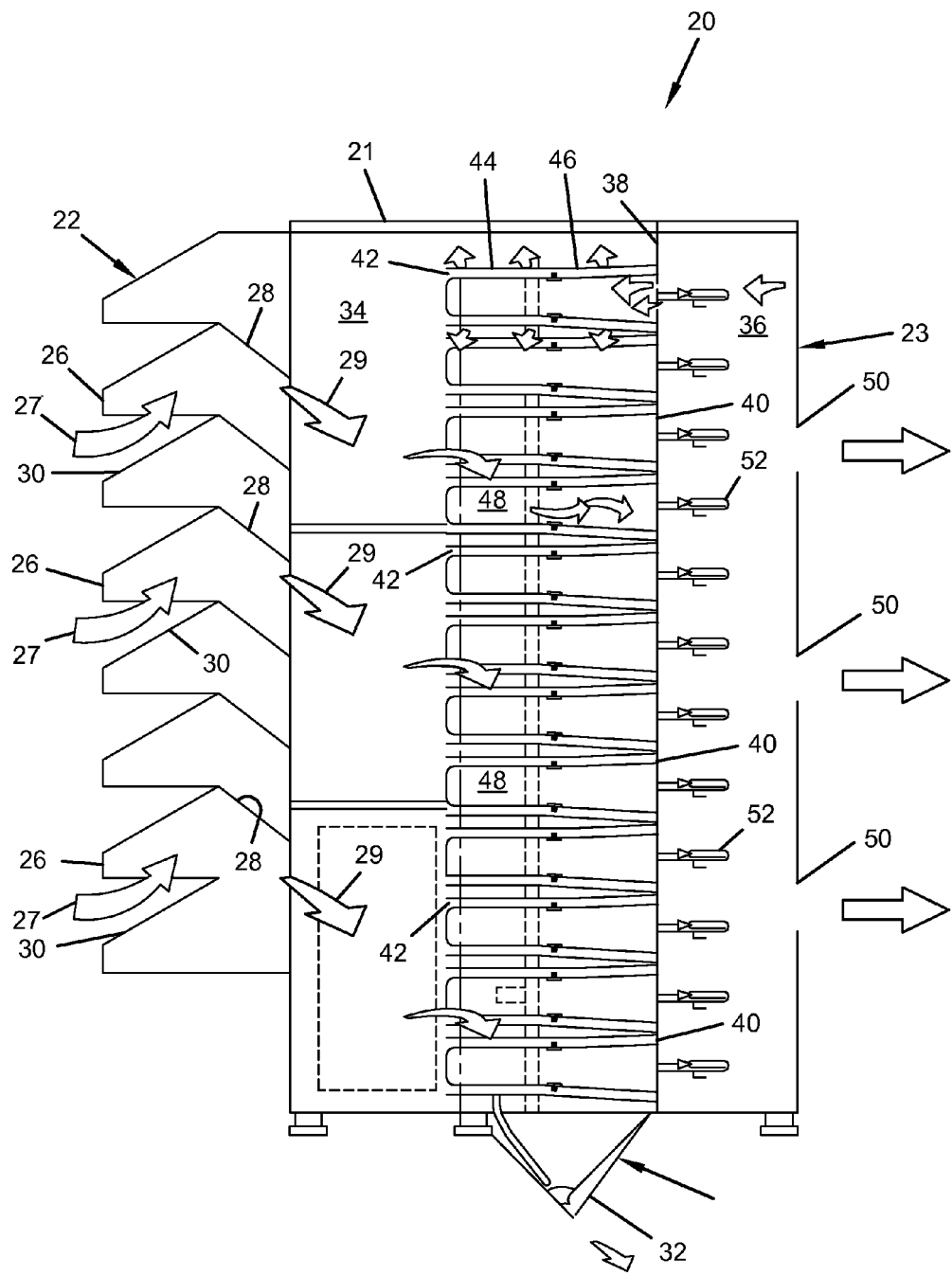
FIG. 1 is a schematic cross-sectional depiction of a gas turbine air intake system, utilizing an assembly in accordance with principles of this disclosure.

In FIG. 1, a schematic, cross-sectional, depiction of a gas turbine air intake system (filter system) is depicted at 20. The system 20 includes a chamber 21 having an air inlet side 22 and an air outlet side 23. Air enters the chamber 21 through a plurality of vertically spaced inlet hoods 26 positioned along the air inlet side 22. The inlet hoods 26, although not required, function to protect internal filters of the system 20 from the effects of rain, snow and sun. Also, the inlet hoods 26 are configured such that air entering the inlet hoods 26 is first directed in an upward direction indicated by arrow 27, and then deflected by deflector plates 28 in a downward direction indicated by arrow 29. The initial upward movement of air causes some particulate material and moisture from the air stream to settle or accumulate on lower regions 30 of the inlet hoods 26. The subsequent downward movement of air forces dust within the chamber 21 downward toward a dust collection hopper 32 located at the bottom of the chamber 21. It should also be noted that air inlet side 22 may have vanes and other mechanical moisture separator inlets.

The chamber 21 of the system 20 is divided into upstream and downstream volumes 34 and 36 by a tube sheet 38 (referred to also as partition 38). The upstream volume 34 generally represents the "dirty air section" of the air cleaner system 20, while the downstream volume 36 generally represents the "clean air section" of the system 20. The tube sheet 38 defines a plurality of apertures 40 for allowing air to flow from the upstream volume 34 to the downstream volume 36. Each aperture 40 is covered by an air filter element arrangement 42 or filter cartridge located in the upstream volume 34 of the chamber. The filter element arrangements 42 are arranged and configured such that air flowing from the upstream volume 34 to the downstream volume 36 passes through the filter arrangement 42 prior to passing through the apertures 40.

For the particular filter arrangement shown in FIG. 1, each air filter element arrangement 42 includes a pair of filter elements. For example, each air filter element arrangement 42 includes a cylindrical element 44 and, a somewhat truncated, conical, element 46. Each truncated, conical element 46 includes one end having a major diameter and another end having a minor diameter. The cylindrical element 44 and the truncated, conical element 46 of each filter element arrangement 42 are co-axially aligned and connected end-to-end with the minor diameter end of each conical element 46 being secured to one of the cylindrical elements 44 in a sealed manner. The major diameter end of each truncated, conical element 46 is secured to the partition 38 such that an annular seal is formed around its corresponding aperture 40. Each filter element arrangement 42 is generally co-axially aligned with respect to its corresponding aperture 40 and has a longitudinal axis that is generally horizontal. Herein, the term "filter element arrangement 42" or variations thereof (such as "air filter 42" or "filter(s) 42" or "filter cartridge 42", etc.) may refer to either a single filter element alone; or a combination of two or more filter elements together such as pairs 44, 46.

In general, during filtering, air is directed from the upstream volume 34 through the filter medium on air filters 42 into interior volumes 48 of the filters 42. After being filtered, the air flows from the interior volumes 48 through the partition 38, via apertures 40, into the downstream clean air volume 36. The clean air is then drawn out from the downstream volume 36 and into a gas turbine intake, not shown.

In this embodiment, each aperture 40 of the partition 38 includes a pulse jet air cleaner 52 mounted in the downstream volume 36. Periodically, the pulse jet air cleaner 52 is operated to direct a pulse jet of air backwardly through the associated air filter 42, i.e. from the interior volume 48 of the filter element outwardly to shake or otherwise dislodge particular material trapped in or on the air filter 42. The pulse jet air cleaners 52 can be sequentially operated from the top to the bottom of the chamber 21 to eventually direct the dust particulate material blown from the filters into the lower hopper 32, for removal. In many air pulse jet cleaning applications, a useful air pressure is generally within the range of 60 to 1500 psi.

B. The Assembly of FIGS. 2-15

The assembly of this system is used to mount filter elements horizontally to a vertically positioned tube sheet. The element support is located around the tube sheet hole through which the filtered air is passing after it is filtered by the filter elements. While the embodiment of FIG. 1 shows filter element pairs, (a cone plus a cylindrical element) the same element support principle can be used to mount other types of filter elements such as single filter elements, double cylindrical elements, double conical elements, and triple cylindrical filter elements. The assembly of this disclosure will align the filter elements correctly to avoid any leaks between the filter elements and the tube sheet, between the individual filter elements, and between the front filter element and the element support. Another aspect includes a fast installation system with handle to easily replace the filter elements without the need of any tools.

(i) Some Problems with Existing Systems

In previous systems, three tubes have been used, which are deformed on both ends to a flat surface. The three tubes are connected together with a bolt and nut combination, and the three tubes are each connected to the tube sheet with a bolt. This type of prior system has several disadvantages. It is difficult to align and position the element support correctly to the tube sheet filter element aperture. It can be important to have the front center of the element support aligned to the mid point of the tube sheet aperture. In previous systems, there can be poor positioning of the filter elements on the element support, including no correct parallelism of the filter element end caps to the tube sheet and to each other. In addition, the support of the filter elements on the liners of the filter elements are not a good reference point of the individual filter elements. Further, existing used materials and coatings do not have a sufficient corrosion protection against human and corrosive environments.

In existing systems that use a perforated plate supporting the filter elements, it is difficult for long filter elements or filter element combinations to be used with such a system. It is difficult to attach to the tube sheet, and it is expensive.

In previous systems, there are basically two methods to install the filter elements on the element support. These include systems that use nuts to assemble the filter elements, and systems that use manual buttons to assemble the filter elements. These existing systems have disadvantages including the systems that use threaded rods have the disadvantage that the threaded rod can be easily damaged or become dirty very easily. This will create difficulties to loosen the nut or button and to install new ones. A replacement of the complete threaded rod would be needed. The systems that use threaded rods have safety issues. All of the rods are sticking out into the maintenance section and are creating a hazard to the persons servicing the system. Different types of protection caps are used to minimize this hazard, although the hazard is not completely eliminated.

In systems that use nuts, tools, such as torque wrenches, are required to install and replace filter elements correctly. When the thread is damaged or dirty, this can give a wrong torque value with the final result of bad filter element installation. Systems that use manual buttons have the disadvantage that the correct filter installation is dependent on the experience of the maintenance persons. The torque value applied on the buttons is not possible to control with this system. In addition, it is difficult to check if the filter elements are correctly tightened by the nut or manual button. There is no visual aspect to see if the nut or button is tightened enough.

(ii) The system of FIGS. 2-15

Figure 2:
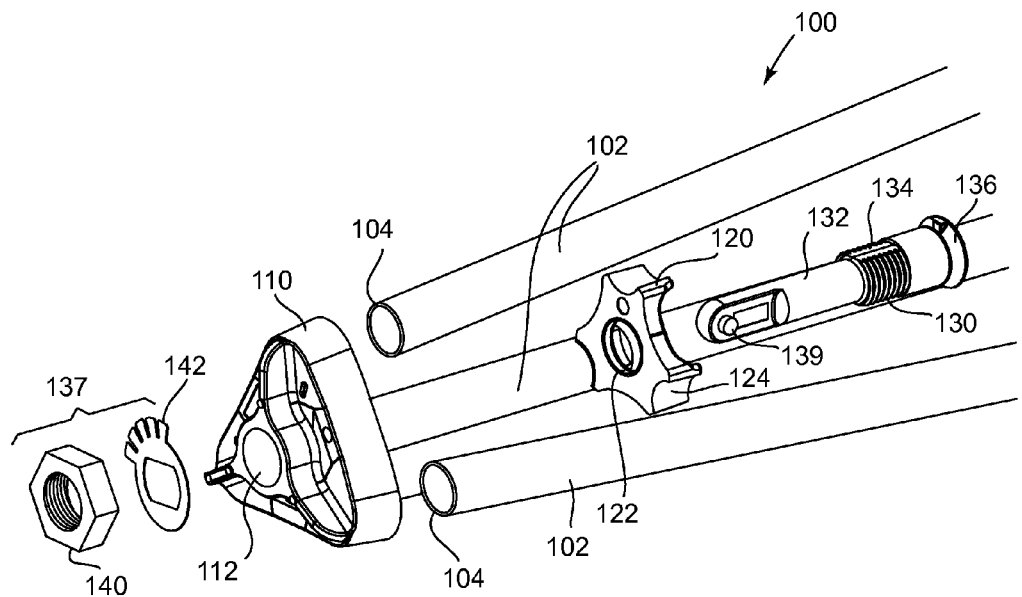
FIG. 2 is an exploded perspective view of the assembly in accordance with principles of this disclosure.
Figure 3:
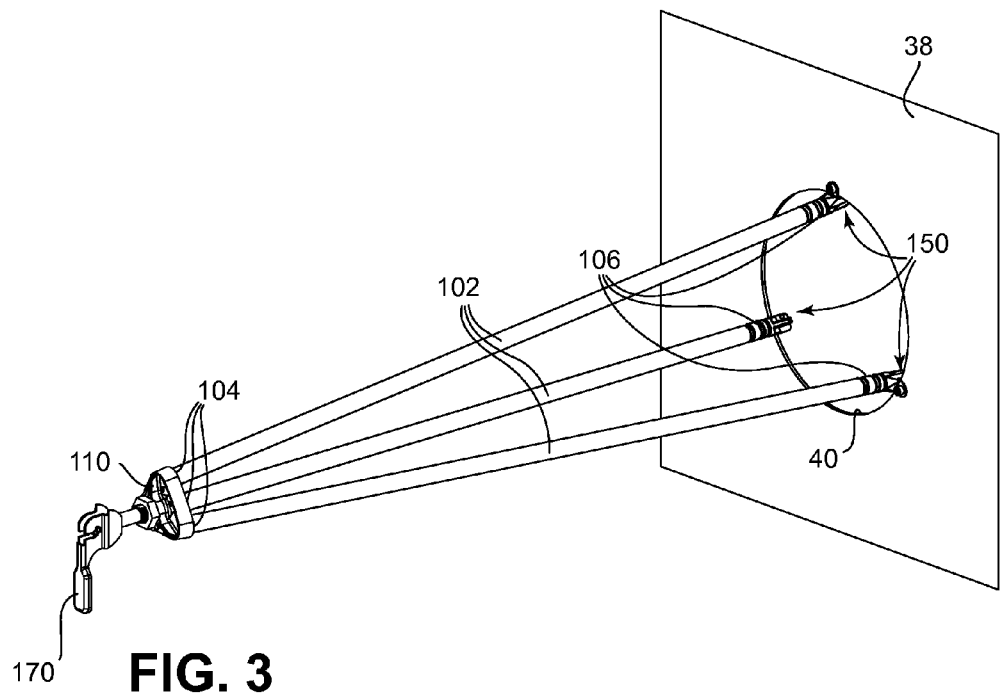
FIG. 3 is a perspective view of portions of the assembly of FIG. 2.
Figure 4:
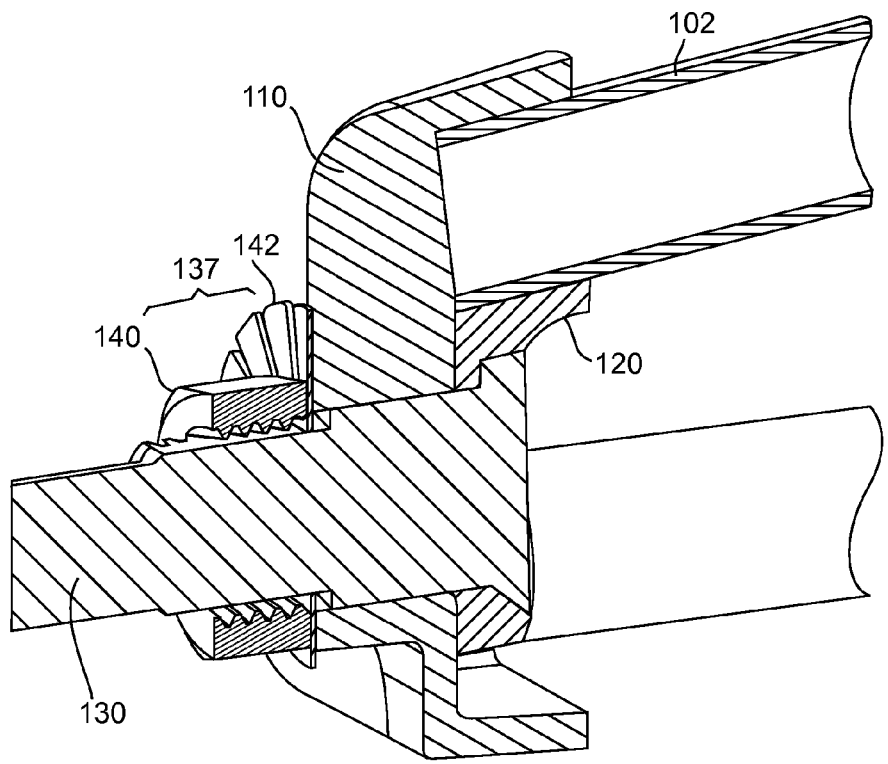
FIG. 4 is a perspective, cross-sectional view of a portion of the assembly of FIG. 2, in an assembled state.

In reference now to FIG. 2, a filter element support assembly is illustrated at 100. The assembly 100 is for mounting a filter element arrangement 42, which includes, for example, the elements 44, 46 (FIG. 1) to a tube sheet, such as tube sheet 38 of FIG. 1. In FIG. 2, the assembly 100 includes a plurality of elongated tubes or rods 102. In this embodiment, there are three rods 102. Each of the rods 102 includes a first end 104 and an opposite second end 106 (FIG. 3). As can be seen in FIG. 3, the rods 102 are angled away from each other such that the first ends 104 are closer to each other than the second ends 106.

Figure 14:
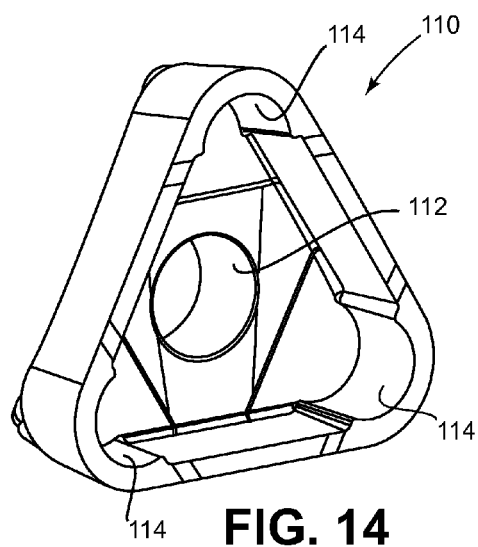
FIG. 14 is a perspective view of a first clamp, used in the assembly of FIG. 2.
Figure 15:
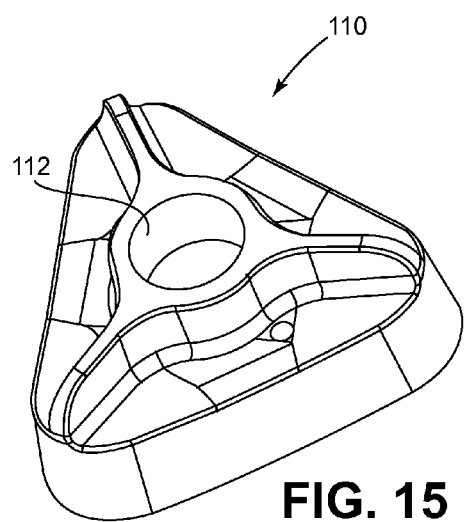
FIG. 15 is a perspective view of the first clamp of FIG. 14.

The assembly 100 also includes a first clamp 110 having a through hole 112. FIGS. 14 and 15 show perspective views of the first clamp 110. The first clamp 110 defines a plurality of rod seats 114 (FIG. 14) sized to receive portion of the rod 102, in this example, the first end 104 of a respective one of the rods 102. In the embodiment shown, the rod seats 114 each hold a first end 104 of one of the rods 102, when the assembly 100 is operably assembled. While many different embodiments are possible, in the example shown in FIGS. 14 and 15, the first clamp 110 generally has a triangular shape. The rod seats 114, in this embodiment, are located in each corner of the triangle shape.

Figure 12:
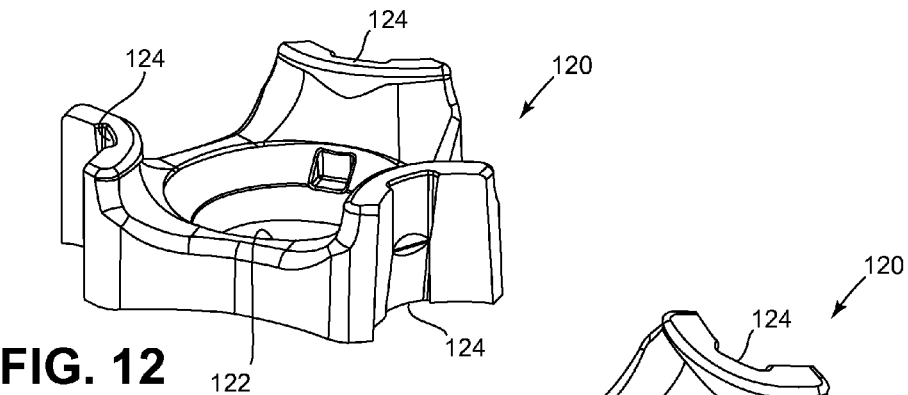
FIG. 12 is a perspective view of a second clamp, used in the assembly of FIG. 2.
Figure 13:
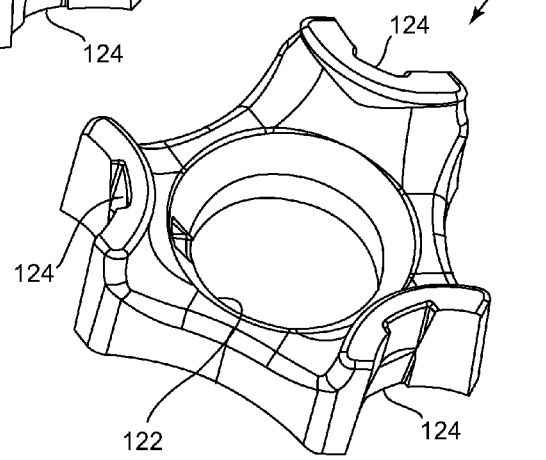
FIG. 13 is another perspective view of the second clamp of FIG. 12.

In this embodiment, the assembly 100 further includes a second clamp 120. The second clamp 120 defines a through hole 122. FIGS. 12 and 13 show perspective views of the second clamp 120. The second clamp 120 is mounted against the first clamp 110, when the assembly 100 is operably assembled. While many different embodiments are possible, in the one shown, the second clamp 120 has a plurality of radially projecting bumps 124 mounted against the rods 102 adjacent to the first clamp 110 to hold the rods 102 in the rod seats 114. As can be seen in FIGS. 12 and 13, the bumps 124 are generally curved in shaped each with a concave recess to mount against the outer surface of the rods 102 in order to trap the rods 102 between the bumps 124 and the rod seats 114.

Figure 5:
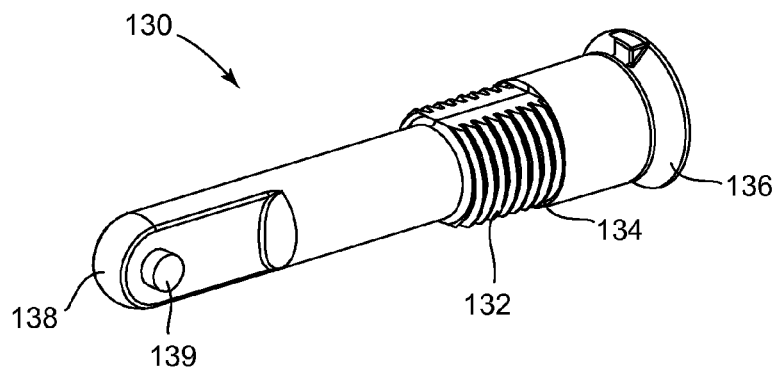
FIG. 5 is a perspective view of a clamp rod used in the assembly of FIG. 2.
Figure 6:
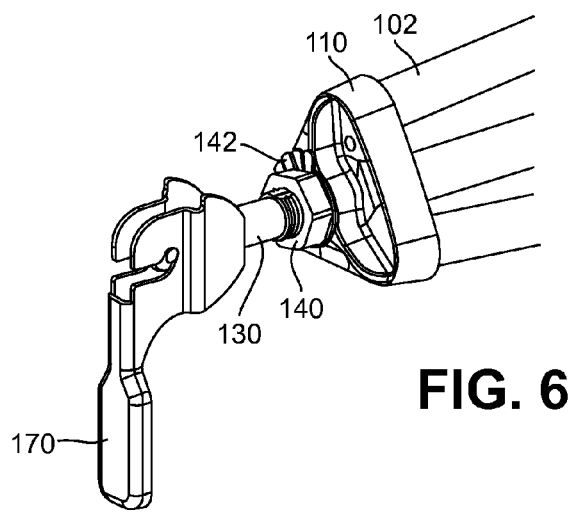
FIG. 6 is a perspective view of a portion of the assembly of FIG. 2.
Figure 7:
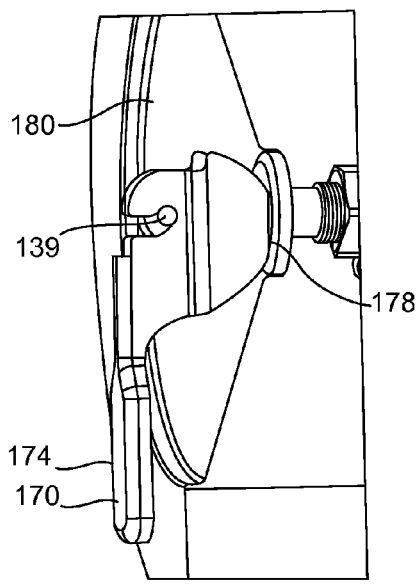
FIG. 7 is a perspective view of the handle assembly of FIG. 2 shown with a cover for a filter element.
Figure 8:
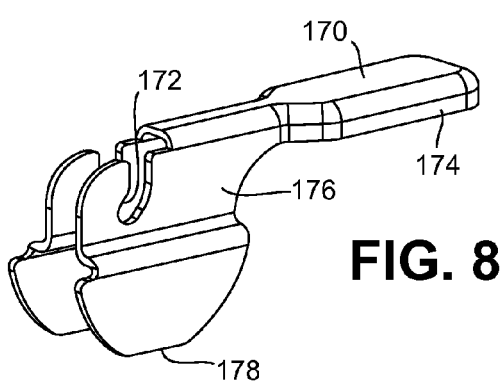
FIG. 8 is a perspective view of the handle of FIGS. 6 and 7.

In this embodiment, a clamp rod 130 is provided. The clamp rod 130 includes a shaft 132 including threads 134 along a portion of the shaft 132. An end flange or head 136 defines one end of the clamp rod 130. An opposite end 138 (FIG. 5) engages a quick-release handle, discussed further below. In FIG. 5, it can be seen how the clamp rod 130 has a lateral projection 139 extending from the shaft 132 adjacent to the end 138. Although not seen in FIG. 5, the projection 139 also extends from the other opposite side of the shaft 132. When assembled, the clamp rod 130 extends through the through hole 112 of the first clamp 110.

A fastener arrangement 137, embodied herein as a nut 140 and a lock washer 142 is secured to the clamp rod 130. Many different embodiments of fastener arrangements may be used. The first clamp 110 is axially between the fastener arrangement 137, (exemplified by the nut 140/lock washer 142) and the second clamp 120. That is, the nut 140 and lock washer 142 are on outside surface of the first clamp 110, while the second clamp 120 is on an inside surface of the first clamp 110. A clamp force is provided by the clamp rod 130 and the nut 140. The lock washer 142 prevents the nut 140 from loosening, by a deformation of one or more lips on the lock washer 142.

The assembly 100 further includes a plurality of feet 150 (FIGS. 3 and 9-11). Each foot 150 is secured to a portion of one of the rods 102. In the embodiment shown, each foot 150 is secured to one of the second ends 106 of one of the rods 102. Each foot 150, in this embodiment, has a rod-receiving shaft 152 and a tube sheet-engaging portion 154. The tube sheet-engaging portion 154 defines a bolt-receiving hole 156.

In FIG. 10, it can be seen how the foot 150 is engaged and connects to the tube sheet 38. A bolt 158 extends through the bolt-receiving hole 156, and a washer 160 is used to trap the tube sheet 38 between the washer 160 and the tube sheet-engaging portion 154. A portion of the filter element can be seen at 162. The washer 160 is unable to turn, so it will not damage the paint on the tube sheet 38. The bolt 158 is situated between the tube sheet 38 and the filter element 162, and is therefore secured from escaping if the bolt 140 becomes loose. The aperture to the tube sheet 38 is shown at reference numeral 40 in FIG. 10. A seal 163 is formed by compression of a seal member 165 of the filter element 162 against the tube sheet 38 adjacent to the aperture 40.

The assembly 100 includes a handle 170. The handle 170 is secured to the end 138 of the clamp rod 130. In this embodiment, the handle 170 is pivotable between a clamped position (FIGS. 3 and 7) and a release position. The projection 139 in the clamp rod 130 engages with a slot 172 defined by the handle 170. The handle 170 includes a gripper 174 sized to receive a human hand and allow for manipulation of the handle 170. Extending from the gripper 174 is a head 176. The head 176 defines the slot 172, which receives the projection 139. The head 176 further defines a bearing surface 178.

When the handle 170 is in the clamped position, the bearing surface 178 is engaged against an end cover 180 that is oriented over an end of the filter element arrangement 42 that is at the end opposite of the tube sheet end. In the clamped position, the slot 172 holding the projection 139 pulls the clamp rod 130, while the bearing surface 178 pushes against end cover 180, which pushes the filter element arrangement 42 with axial force against the tube sheet 38, causing the seal member 165 to compress against the tube sheet 38 and form seal 163 with the tube sheet 38.

The release position includes the bearing surface 178 being pivoted away from the end cover 180. In the release position, the gripper 174 is generally oriented to be aligned with the clamp shaft 130. When the bearing surface 178 is not engaged against the end cover 180, the projection 139 is no longer being pulled by the slot 172 in the handle 170. This releases the axial force of the filter element arrangement 42 against the tube sheet 38, causing the seal member 165 to decompress against the tube sheet 38 and releasing the seal 163 with the tube sheet 38.

The handle 170 is quick and easy to use. The installation is not dependent upon the experience of the maintenance personnel. There is no tooling needed, so the assembly 100 may be used without the use of tools. No specific skills or experiences required. In addition, it is easy to quickly check and evaluate that all the filter elements 42 are correctly installed and attached to the element support, because a visual check will indicate whether all of the handles 170 are located vertically downwards in a position such that the bearing surface 178 is against the element cover 180. When all the handles 170 are in this position, the filter elements 42 are correctly installed.

Gas turbine air intake systems 20 may be retrofitted with the assembly 100. Existing filter mounting systems may be removed from the gas turbine air intake system and replaced with assembly 100 to mounting a filter element, such as the elements 44, 46 (FIG. 1) to tube sheet 38 of FIG. 1.

After a period of use, the gas turbine air intake system 20 will need servicing. That is, after a period of use, the media in the filter elements 42 will become loaded with dust and debris, and the filter elements 42 will need to be removed and replaced. To service the gas turbine air intake system 20, the person doing the servicing does not need tools. The person doing the servicing will grasp the gripper 174 of the handle 170 and move the handle 170 from the clamped position to the release position. When the handle 170 is pivoted to the release position, the bearing surface 178 is pivoted away from the end cover 180. This action releases the pulling force on the projection 139, which releases the axial force of the filter element arrangement 42 against the tube sheet 38. This release of axial force then permits the seal member 164 to decompress from against the tube sheet 38, which releases the seal 163 with the tube sheet 38.

The handle 170 and fastener arrangement is then removed. Again, this is done without the use of tools. The handle 170 is released by moving it from engagement between the slot 172 and the projection 139 of the shaft 132. The fastener arrangement 137, illustrated as nut 140 and lock washer 142, are removed from the clamp rod 130. After removing the handle 170, the nut 140, and lock washer 142, the filter element arrangement 42 may be removed from the tripod, which includes rods 102, first clamp 110, clamp rod 130, and second clamp 120.

The old filter element arrangement 42 is then discarded. A new filter element arrangement 42 is provided. The new filter element arrangement 42 is operably mounted over the tripod, including the rods 102, first clamp 110, clamp rod 130, and second clamp 120. The fastener arrangement 137 is then secured to the clamp rod 130. In one example, this is accomplished by placing lock washer 142 and then nut 140 over the end of the clamp rod 130, such that the first clamp 110 is axially between the nut 140, lock washer 142 and the second clamp 120.

Next, the handle 170 is connected to the clamp rod 130 by engaging the slot 172 with the projection 139 extending from the clamp rod 130. The handle 170 is then pivoted, such that the bearing surface 178 engages against the end cover 180 of the filter element arrangement 42. This pivoting action causes the slot 172 to pull against the projection 139, and apply a pulling force to the clamp rod 130. This pushes the filter element arrangement 42 with axial force against the tube sheet 38, causing the seal member 165 to compress against the tube sheet 38 and form seal 163 with the tube sheet 38. The gas turbine air systems 20 is again ready for operation.

It is noted that not all specific features described herein need to be incorporated in an arrangement for the arrangement to have some selected advantage according to the present disclosure. Various combinations, including only one or more features, can be selected to advantage.

In general, a filter element support assembly for mounting a filter element arrangement to a tube sheet is provided. The support assembly can include a plurality of elongated rods having first ends.

The support assembly can include a first clamp having a through-hole; the first clamp defining a plurality of rod seats sized to one of the rods; the rods seats each holding one of the rods.

The support assembly can include a clamp rod extending through the through-hole in the first clamp.

The support assembly may have a second clamp having a through-hole; the clamp rod extending through the second clamp through-hole; the second clamp being mounted against the first clamp.

The second clamp holds the rods in the rod seats.

A fastener arrangement is provided secured to the clamp rod; the first clamp being axially between the fastener arrangement and the second clamp.

A plurality of feet is provided, with each foot being secured to a portion of one of the rods.

A handle may be secured to an end of the clamp rod.

In some embodiments, there are at least 3 rods; the rods being angled away from each other such that the first ends of the rods are closer to each other than the second ends of the rods.

The clamp rod can have a threaded shaft extending through the through hole in the first clamp.

The second clamp may include a plurality of radially projecting bumps mounted against the rods adjacent to the first clamp to hold the rods in the rod seats.

The fastener arrangement can include a nut and a lock washer secured to the clamp rod; the first clamp being axially between the nut/lock washer and the second clamp.

Each foot can be secured to a second end, opposite of the first end, of one of the rods.

The handle may be pivotable between a clamped position and a release position.

The first clamp can be generally triangular shaped.

Each foot may have a rod-receiving shaft and tube sheet engaging portion; the tube sheet engaging portion defining a bolt-receiving hole.

A filter system can be assembled including a tube sheet having a plurality of tube sheet apertures; and a support assembly as characterized above. The feet may secure the support assembly to the tube sheet aperture. A filter element can be mounted on the support assembly; an end cover on an end of the filter element. The handle is pivotable between a clamped position engaging the end cover and a release position.

A quick-release system to clamp and release a filter element onto a tube sheet is provided. The system may a filter element support assembly constructed and arranged to be secured to the tube sheet; a filter element arrangement mounted over the support assembly and having a tube sheet end mountable against the tube sheet so that when the filter element arrangement is mounted against the tube sheet, the filter element arrangement is in communication with the aperture of the tube sheet; an end cover oriented over an end of the filter element arrangement opposite of the tube sheet end; and the support assembly including a handle having a bearing surface and being moveable between a clamped position and a release position. The clamped position can include the handle bearing surface being engaged against the end cover; and the release position can include the handle bearing surface being away from the end cover.

The above are examples. Many embodiments can be made.

We claim:

1. A quick-release system to clamp and release a filter element arrangement onto a tube sheet having an aperture; the system comprising:
   (a) a filter element support assembly constructed and arranged to be secured to the tube sheet;
   (b) a filter element arrangement mounted over the support assembly and having a tube sheet end mountable against the tube sheet so that the filter element arrangement is in communication with the aperture of the tube sheet;
   (c) an end cover oriented over an end of the filter element arrangement opposite of the tube sheet end; and
   (d) the support assembly including a handle; the handle being pivotable between a clamped position and a release position; the handle including,
      (i) a gripper sized to be gripped by a human hand and being pivotable along a plane perpendicular to the tube sheet; and
      (ii) a head extending from the gripper, no portion of the head being wider than the gripper;
         (A) the head having a flat bearing surface; and
         (B) the head defining an open slot, opposite of the bearing surface; wherein the clamped position includes the handle bearing surface engaged against the end cover; and the release position includes the handle bearing surface being away from the end cover.

2. The quick-release system of claim 1 wherein the bearing surface is laterally offset from the gripper.

3. The quick-release system of claim 1 wherein an opening for the open slot in the head intersects a plane containing the gripper.

4. The quick-release system of claim 1 wherein:
(a) the support assembly includes a tripod of legs and a clamp rod extending therefrom; and
(b) the clamp rod is releasably engageable with the handle.

5. The quick-release system of claim 4 wherein the gripper is aligned with the clamp rod, when the handle is in the release position.

6. The quick-release system of claim 4 wherein:
(a) the clamp rod has a lateral projection extending therefrom; and
(b) the open slot in the head of the handle receives the projection, when the handle is in the clamped position, and releases the projection, when the handle is in the release position.

7. The quick-release system of claim 4 further comprising a fastener arrangement secured to the clamp rod.

8. The quick-release system of claim 7 further comprising:
(a) a first clamp having a through-hole; the clamp rod extending through the through-hole in the first clamp;
  (i) the first clamp defining a plurality of rod seats sized to receive one of the legs; and
(b) a second clamp having a through-hole; the clamp rod extending through the second clamp through-hole; the second clamp being mounted against the first clamp.

9. A quick-release system to clamp and release a filter element arrangement onto a tube sheet having an aperture; the system comprising:
(a) a filter element support assembly constructed and arranged to be secured to the tube sheet;
(b a filter element arrangement mounted over the support assembly and having a tube sheet end mountable against the tube sheet so that the filter element arrangement is in communication with the aperture of the tube sheet;
(c) an end cover oriented over an end of the filter element arrangement opposite of the tube sheet end;
(d) the support assembly including a handle; the handle being pivotable between a clamped position and a release position; the handle including,
  (i) a gripper sized to be gripped by a human hand; and
  (ii) a head extending from the gripper;
    (A) the head having a flat bearing surface; and
    (B) the head defining an open slot, opposite of the bearing surface; wherein the clamped position includes the handle bearing surface engaged against the end cover; and the release position includes the handle bearing surface being away from the end cover;
wherein the support assembly includes a tripod of legs and a clamp rod extending therefrom; the clamp rod is releasably engageable with the handle; and a fastener arrangement is secured to the clamp rod; and
(e) further comprising a first clamp having a through-hole; the clamp rod extending through the through-hole in the first clamp; the first clamp defining a plurality of rod seats sized to receive one of the legs; and a second clamp having a through-hole; the clamp rod extending through the second clamp through-hole; the second clamp being mounted against the first clamp.

* * * * *